Dec. 30, 1941.   E. BENNETT   2,267,969
TRAILER HITCH
Filed April 24, 1941   2 Sheets-Sheet 1

Inventor
Ernest Bennett,

By Clarence A. O'Brien

Attorney

Dec. 30, 1941.　　　　　E. BENNETT　　　　　2,267,969
TRAILER HITCH
Filed April 24, 1941　　　　2 Sheets-Sheet 2
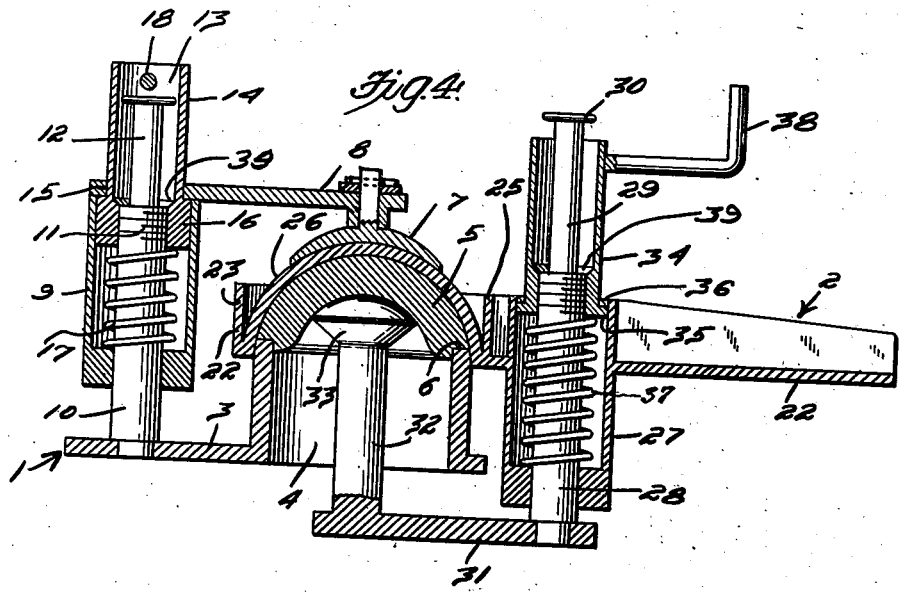
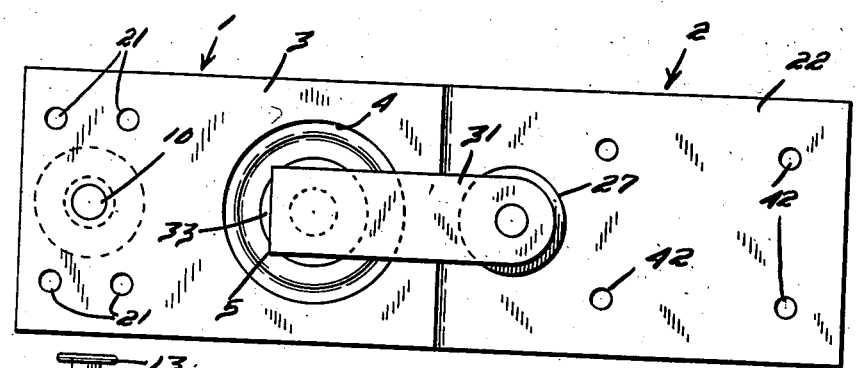
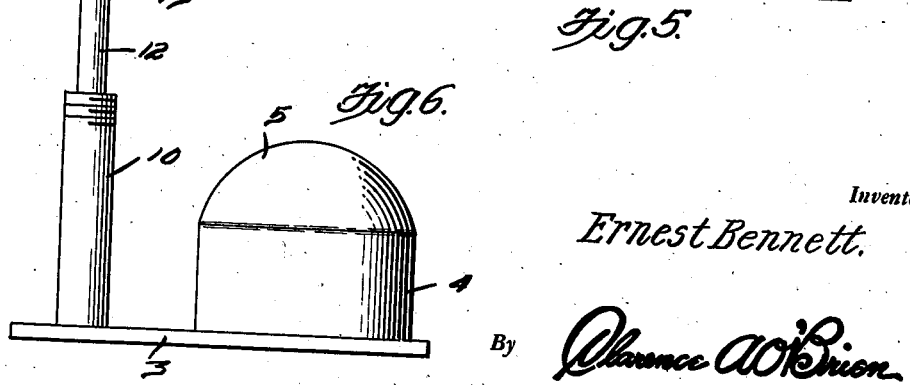
Inventor
Ernest Bennett.
By Clarence A. O'Brien
Attorney Patented Dec. 30, 1941

2,267,969

UNITED STATES PATENT OFFICE 2,267,969

TRAILER HITCH

Ernest Bennett, Silver City, N. Mex.

Application April 24, 1941, Serial No. 390,168

2 Claims. (Cl. 280—33.17)

My invention relates to improvements in trailer hitches, the principal object in view being to provide a simply constructed, inexpensive and easily installed hitch coupled together by a universal joint the parts of which are held in assembled relation by leverage exerted thereagainst, whereby the hitch is adapted to be easily and quickly coupled and securely held against uncoupling.

To the accomplishment of the above, and subordinate objects presently appearing, a preferred embodiment of my invention has been illustrated in the accompanying drawings, set forth in detail in the succeeding description, and defined in the claims appended hereto.

Figure 1:
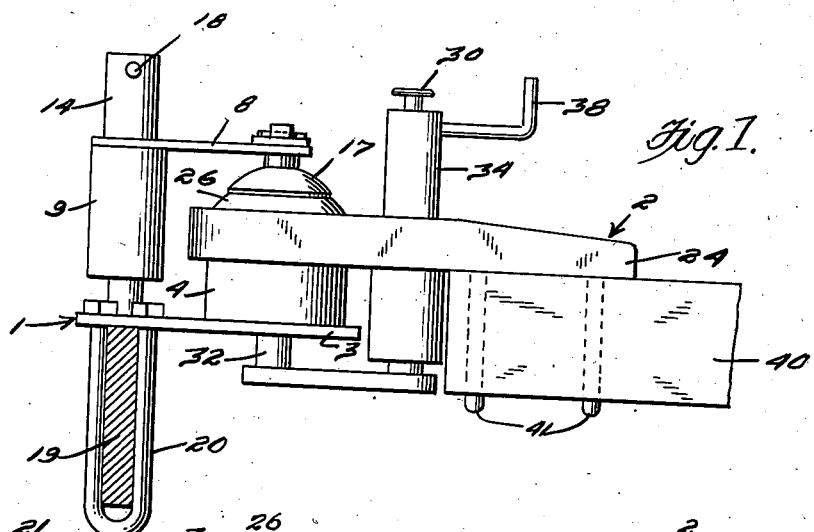
Figure 2:
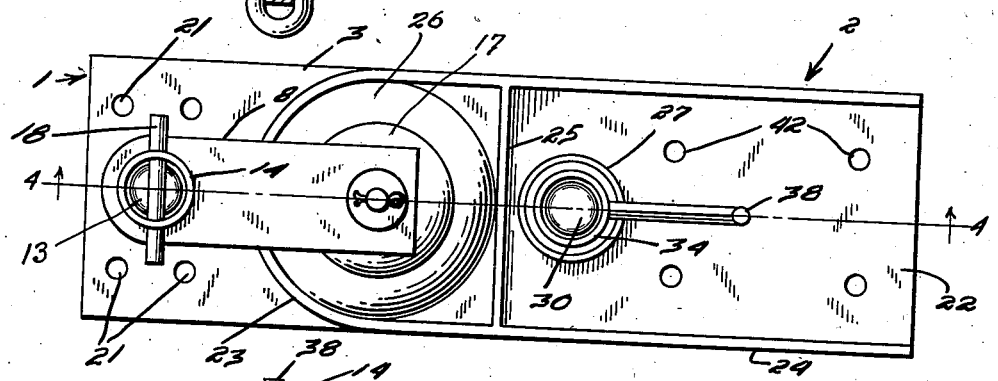
Figure 3:
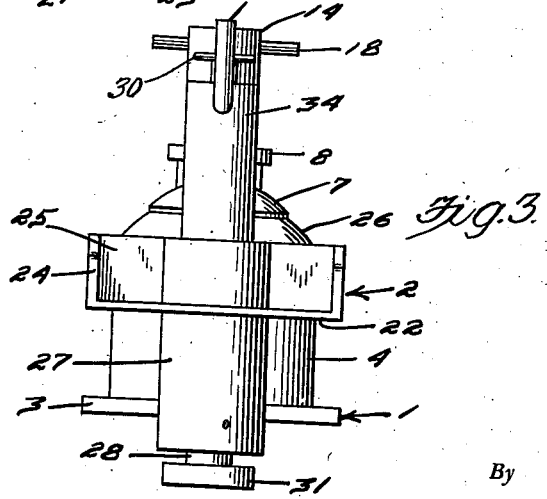

In said drawings:

Figure 1 is a view in side elevation, partly in section, of the preferred embodiment of my invention, Figure 2 is a view in top plan, Figure 3 is a rear end view, Figure 4 is a view in longitudinal vertical section taken on the line 4—4 of Figure 2, Figure 5 is a view in bottom plan, and Figure 6 is a view in side elevation of the male joint member and parts associated therewith.

Reference being had to the drawings by numerals, my improved trailer hitch, in the illustrated embodiment thereof, comprises a tow unit 1 designed to be attached to a tow vehicle such as an automobile, not shown, and a draft unit 2 for attachment to the trailer, also not shown. The units 1, 2, are formed of any suitable light, strong metal and are attached as presently described.

The tow unit 1 comprises a base plate 3 of rectangular form having adjacent the rear end thereof and in the longitudinal center of the same an upstanding cylindrical support 4 for a male joint member 5 of semi-circular, dome-like form, and relatively thicker and harder metal, said joint member surmounting the support. The male joint member 5 is rabbeted around its edge, as at 6, to fit on the support 4 and may be secured thereto in any suitable manner, as by welding, not shown.

Disposed above the male joint member 5 is an upper, concavo-convex clamping member 7, smaller than the member 5, and located axially thereof, said member 7 having the same internal radius as said member 5 and being suspended from a lever arm 8 extending forwardly of the plate 3 and forming at its front end the top of an upstanding cylindrical housing 9, said member being preferably journaled, as at 7', in said arm for rotation about its axis and for a purpose presently clear. The housing 9 is sleeved at its bottom for vertical sliding and rotary movement thereon, on a round post 10 arising from the plate 3 adjacent the front end of the latter in the longitudinal center of the same and of smaller diameter than said housing. The upper end of the post 10 is externally threaded, as at 11, and is provided with an upper end, axial, reduced stem 12 terminating in a flat head 13, for a purpose presently explained. Turned onto the upper end of the post 10 is a clamp adjusting member 14 of tubular form extending upwardly above the lever arm 8 through a suitable aperture 15 in the latter and slidable in said aperture, said adjusting member also extending above the head 13 for a purpose presently seen and having an enlarged lower end 16 slidably fitting in the housing 9 and threaded onto said post 10. A spiral tension spring 17 in the housing 9 sleeved onto the post 10, between the bottom of said housing and the enlarged end 16 of the clamp adjusting member 14 urges the housing 9 downwardly on the post 10 and hence the clamping member 7 downwardly toward clamping relation.

A transverse bar extending through the upper end of the clamp adjusting member 14 provides a hand grip for use in turning said member 14 and also acts by engagement with the head 13 of stem 12 to limit downward adjustment of said member 14 to prevent it from being turned down off the threads 11. The clamping member 7 forms one element of a pair of upper and lower clamping elements, the latter to be described.

The described tow unit 1 is fixed to the rear bumper 19, or a draft bar, of the automobile, on top thereof, by a pair of U-bolts, one of which is shown at 20, extending through apertures 21 in the front end of the plate 3 upon opposite sides of the longitudinal center of said plate.

As will now be seen, by turning the clamp adjusting member 14 downwardly on the post 10 in opposition to the spring 17, the clamping member 7 forming the upper clamping element of the before-mentioned pair, may be adjusted downwardly into clamping relation to the other clamping element of the pair, and conversely, by turning said member 14 upwardly on the post 10, the adjusting member 14, under engagement of the enlarged end thereof with the lever 8 will raise said housing and lever and hence the clamping member from clamping relation and permit said member 7, lever 8, and housing 9 to be rotated around post 10 to swing said member 7 from over the male joint member 5.

The draft unit 2 comprises an elongated plate 22 having a rounded front end 23, a marginal upstanding, reinforcing flange 24 extending along the sides thereof and around the front end, an intermediate, upstanding cross flange 25, and a female joint member 26 of semi-circular, dome-like form intermediate the cross flange 25 and the front of flange 24 and fitting over the male joint member 5. In the rear of the flange 25 said plate 22 has formed integrally therewith, in the longitudinal center thereof, an open top cylindrical housing 27, vertically disposed, and extending above said plate for a suitable distance, said housing also depending below the plate for a purpose presently seen. A relatively smaller post 28, similar to post 10, is slidably extended axially through the bottom of the housing 27 and which is provided with a stem 29 with a flat head 30 thereon similar to stem 10 and extending above said housing 27. The lower end of the post 28 extends below the housing 27 and has suitably formed thereon the rear end of a forwardly extending lever arm 31. The lever arm 31 is provided on the front end thereof, in the axis of the described male and female joint members 5, 26, with an upstanding clamping post 32 extending up into the support 4 and crowned by a rounded, enlarged clamping head 33 fitting concentrically thereof into the male joint member 5 and forming the lower clamping element of the before mentioned pair.

A clamp adjusting member 34, similar to member 14, is threaded onto the upper end of the post 28, with its lower enlarged end 35 slidable in the upper end of the housing 27 below a collar 36 fixed in said end of said housing. A spring 37, similar to spring 17, is sleeved onto the post 28 between said member 34 and the bottom of the housing 27 and urges the adjusting member 34 upwardly against the collar 36. The collar 36, as will be clear, prevents the clamp adjusting member 34 from being withdrawn completely from the housing 27. A crank 38 on the upper end of the adjusting member 34 provides a hand grip on said member for turning the same.

Both clamp adjusting members 14, and 34, are provided with lower internal shoulders 39 for engagement by the heads 13 and 30 to prevent said adjusting members from being withdrawn from the posts 10 and 28 entirely so that said posts and adjusting members form a unitary structure for assembling in the units 1 and 2 as such.

The draft unit 2 may be fixed to the draft tongue 40 of the trailer, not shown, by U-bolts 41 extending through suitable bolt apertures 42 in the plate 22.

By turning the adjusting member 34 of draft unit 2 in one direction on the post 28, the said post will be drawn upwardly, the lever arm 31 correspondingly operated and the clamping head 33 of post 32, or in other words, the lower clamping element of the pair, may be clamped against the under face of the male joint member 5. Also, by turning the adjusting member 14 to lower the housing 9, lever arm 8 and the upper clamping member 7, in the manner already described, said member 7, or upper clamping element, may be clamped against the top of the female joint member 26. Thus the joint members 5, 26, may be yieldingly clamped together for universal relative movement.

To uncouple the described joint, the clamping member 7 may be disengaged from clamping relation by turning of the adjusting member 14 in the proper direction, and swinging of the member 14 from over the joint, all as previously described. The clamping head 33 is disengaged by turning the clamp adjusting member 34 in the proper direction until the post 28 is forced downwardly completely out of the adjusting member 34. Pressure is then exerted downwardly on the head 30 of the stem 29 of said post 28 by means of a suitable instrument until the clamping head 33 is lowered out of the support 4 clear of the same. At this point, the lever arm 31 and post 28 may be rotated to swing the clamping head 33 to one side of the tow unit 1 so that the female joint member 26 may be lifted off the male joint member 5. The manner in which the joint is coupled will be readily understood from the description of the uncoupling operation, said coupling operation being merely substantially a reversal of the uncoupling operation.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

Having thus described the invention, what I claim is:

1. In a trailer hitch, a tow unit and a draft unit, adapted to be attached in fixed position to a tow vehicle and a trailer, respectively, the tow unit including a plate, an upstanding cylindrical support on said plate, a male universal joint member of semi-circular form fixed on said support in upwardly arched position, a post arising from said plate, and an arm mounted on said post to extend laterally therefrom over said member and terminating at one end in a concavo-convex member for clamping relation to said male member, said arm being vertically movable on said post for adjustment of the concavo-convex member into and from clamping relation and being spring tensioned to adjust said concavo-convex member toward clamping relation, said draft unit comprising a plate having a dome-like female joint member fitting over said male member for clamping thereto by said concavo-convex member.

2. In a trailer hitch a tow unit and a draft unit adapted to be attached in fixed position to a tow vehicle and a trailer, respectively, the tow unit including a plate, an upstanding cylindrical support on said plate, and a male universal joint member of semi-circular form fixed on said support in upwardly arched position, said draft unit including a plate having at one end a dome-like female joint member fitting over said male member, a post mounted in said last-named plate for vertical sliding movement, a lateral arm extending from said post beneath said support, a second post upstanding from said arm and extending into said support, and having an enlarged convex head fitting into said male member, and spring means urging said posts and arm upwardly whereby said female member and head are caused to clampingly engage opposite sides of said male member.

ERNEST BENNETT.